(12) United States Patent
Yasaki et al.

(10) Patent No.: US 7,802,112 B2
(45) Date of Patent: Sep. 21, 2010

(54) INFORMATION PROCESSING APPARATUS WITH SECURITY MODULE

(75) Inventors: Kouichi Yasaki, Kawasaki (JP); Seiki Shibata, Kawasaki (JP); Isamu Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1511 days.

(21) Appl. No.: 11/023,132

(22) Filed: Dec. 28, 2004

(65) Prior Publication Data
US 2006/0053302 A1    Mar. 9, 2006

(30) Foreign Application Priority Data
Sep. 7, 2004    (JP)    ............................. 2004-259807

(51) Int. Cl.
*G06F 11/30*    (2006.01)
(52) U.S. Cl. ....................... 713/194; 713/176; 380/277; 726/2
(58) Field of Classification Search ...................... 713/1, 713/2, 183, 188, 189, 193, 194; 380/200, 380/201, 255, 277; 726/2
See application file for complete search history.

(56) References Cited

U.S. PATENT DOCUMENTS

| | | | | |
|---|---|---|---|---|
| 6,078,888 | A * | 6/2000 | Johnson, Jr. .................... | 705/1 |
| 6,526,508 | B2 * | 2/2003 | Akins et al. .................. | 713/168 |
| 6,622,132 | B1 * | 9/2003 | Oshima et al. ................ | 705/56 |
| 6,978,021 | B1 * | 12/2005 | Chojnacki .................... | 380/202 |
| 7,069,439 | B1 * | 6/2006 | Chen et al. ................... | 713/172 |
| 7,181,629 | B1 * | 2/2007 | Hatanaka et al. ............. | 713/194 |
| 7,228,436 | B2 * | 6/2007 | Kawaguchi ................. | 713/189 |
| 7,236,455 | B1 * | 6/2007 | Proudler et al. ............. | 370/230 |
| 7,359,517 | B1 * | 4/2008 | Rowe .......................... | 380/284 |

(Continued)

FOREIGN PATENT DOCUMENTS

JP    05-290225    11/1993

(Continued)

*Primary Examiner*—Kimyen Vu
*Assistant Examiner*—Joseph Pan
(74) *Attorney, Agent, or Firm*—Fujitsu Patent Center

(57) ABSTRACT

An information processing apparatus includes a TPM, a key management module for managing a key database, a memory, and a file processing module for encrypting and decrypting a file. The TPM stores a first TPM key therein and encrypts a third TPM key. The key management module stores and manages the third TPM key in the database. When the information processing apparatus starts communicating with the tamper-proof device, the key management module receives, from the TPM, a parameter for generating a second TPM key, provides the received parameter to the tamper-proof device, receives from the tamper-proof device the second TPM key which has been encrypted using the first TPM key, and provides the TPM with the second TPM key and with the third TPM key which has been encrypted using the second TPM key. When the second TPM key contains password check information, the TPM receives from the tamper-proof device a password associated with the password check information, and verifies the received password using the password check information. When it is verified that the password is correct, the TPM decrypts the second TPM key using the first TPM key, decrypts the third TPM key using the decrypted second TPM key, and decrypts, using the decrypted third TPM key, an encrypted encryption key for decrypting the file. The file processing module decrypts the file using the decrypted encryption key.

6 Claims, 14 Drawing Sheets

U.S. PATENT DOCUMENTS

| | | | |
|---|---|---|---|
| 7,362,868 B2 * | 4/2008 | Madoukh et al. | 380/277 |
| 2003/0046542 A1 * | 3/2003 | Chen et al. | 713/176 |
| 2004/0025039 A1 * | 2/2004 | Kuenzi et al. | 713/193 |
| 2004/0249961 A1 * | 12/2004 | Katsube et al. | 709/229 |
| 2009/0034740 A1 * | 2/2009 | Gentry | 380/278 |

FOREIGN PATENT DOCUMENTS

| | | |
|---|---|---|
| JP | 2001-333056 | 11/2001 |
| JP | 2003-507784 | 2/2003 |
| WO | 01/13198 | 2/2001 |

* cited by examiner

TPM: Trusted Platform Module
TSS: TCG Software Stack

INFORMATION PROCESSING APPARATUS WITH SECURITY MODULE

FIELD OF THE INVENTION

The present invention relates to authentication using a tamper-proof device for use in a TCG (Trusted Computing Group) system for an information processing apparatus.

BACKGROUND ART

A known TCG system allows a user to couple a tamper-proof device storing a password for user authentication, such as an IC card, a smart card and a USB token, to an information processing apparatus or terminal unit, such as a notebook personal computer, a desktop personal computer and a mobile telephone, and then allows the user to decrypt and open an encrypted file on the information processing apparatus. In this system, conventionally a file of a TPM key generated in the information processing apparatus is stored in its hard disk. The TPM key includes a decryption key which is necessary to decrypt the encrypted file and also password check information for permitting the decryption. In order to decrypt the encrypted file, the user loads the TPM key loaded from the hard disk to a TPM (Trusted Platform Module) called a security chip, and also loads the password from the tamper-proof device to the TPM. When the two passwords from the TPM key and the device match with each other, the TPM allows the encrypted file to be decrypted using an encryption/decryption key read into the TPM.

For maintaining the security of the TCG system, it is necessary to regularly update a password stored in the tamper-proof device. To update the password, the tamper-proof device is coupled to the information processing apparatus, and a new password is entered through a keyboard to change the password. When a plurality of such information processing apparatuses employ the TCG system, it is necessary for the user to update the same number of passwords as the number of the information processing apparatuses.

PCT International Publication WO 01/013198 (A) published on Feb. 22, 2001 discloses a computer system which is adapted to restrict operations on data. This computer system includes a computer platform having a secure operator for checking whether a user of the platform is licensed to perform a requested operation on data and for enabling use of the data; a mobile trusted module containing a user identity, wherein the trusted module is a component adapted to behave in an expected manner and resistant to unauthorized external modification; and an access profile specifying license permissions of users with respect to the data. The computer platform contains a platform trusted module, which engages in mutual authentication with the mobile trusted module and which contains a secure operator. The secure operator is adapted to check the access profile to determine whether a requested operation is licensed for used identity contained in the mobile trusted module.

SUMMARY OF THE INVENTION

In accordance with an aspect of the present invention, an information processing apparatus is adapted to communicate with a tamper-proof device, and includes a TPM, a key management module for managing a key database, a memory, and a file processing module for encrypting and decrypting a file. The TPM stores a first TPM key therein and encrypts a third TPM key. The key management module stores and manages the third TPM key in the database. When the information processing apparatus starts communicating with the tamper-proof device, the key management module receives, from the TPM, a parameter for generating a second TPM key, provides the received parameter to the tamper-proof device, receives from the tamper-proof device the second TPM key which has been encrypted using the first TPM key, and provides the TPM with the second TPM key and with the third TPM key which has been encrypted using the second TPM key. When the second TPM key contains password check information, the TPM receives from the tamper-proof device a password associated with the password check information, and verifies the received password using the password check information. When it is verified that the password is correct, the TPM decrypts the second TPM key using the first TPM key, decrypts the third TPM key using the decrypted second TPM key, and decrypts, using the decrypted third TPM key, an encrypted encryption key for decrypting the file. The file processing module decrypts the file using the decrypted encryption key.

In accordance with another aspect of the present invention, an information processing device includes a connector or wire terminal for communicating with a separate information processing apparatus, a module for generating a TPM key, and a memory. The memory stores therein an encryption key, a decryption key, at least one password, and a public key of an external TPM key. The generating module generates, in accordance with the password, information to be used for verifying the password, and encrypts the decryption key using the public key of the external TPM key, to thereby generate a TPM key which contains the encrypted decryption key and the information to be used for verifying the password. The generating module is adapted to provide the generated TPM key to the separate information processing apparatus.

The invention also relates to a method for providing the information processing apparatus described above.

DESCRIPTION OF THE PREFERRED EMBODIMENTS

In order to maintain the security so as to change a password for a tamper-proof device used for authentication in a plurality of information processing apparatuses, the passwords stored in all of these information processing apparatuses are conventionally required to be changed. Thus it may be cumbersome for a user to consistently change the passwords in the tamper-proof device and all of the information processing apparatuses. In addition, in the TGC system, there is a risk that an unauthorized party may analyze the data stored on a hard disk in the information processing apparatus without using the tamper-proof device for authentication.

The inventors have recognized that it is advantageous to allow change of a password only within a tamper-proof device for authentication to be required for security of a plurality of information processing apparatuses.

An object of the present invention is to allow change of a password only within a tamper-proof device for authentication to be required for security of an information processing apparatus.

According to the invention, change of a password only within a tamper-proof device for authentication is required for security of a plurality of information processing apparatuses. It is not necessary to change passwords within information processing apparatuses related to the device, and hence it can be very easy to change the password.

The invention will be described with reference to the accompanying drawings. Throughout the drawings, similar symbols and numerals indicate similar items and functions.

Figure 1:
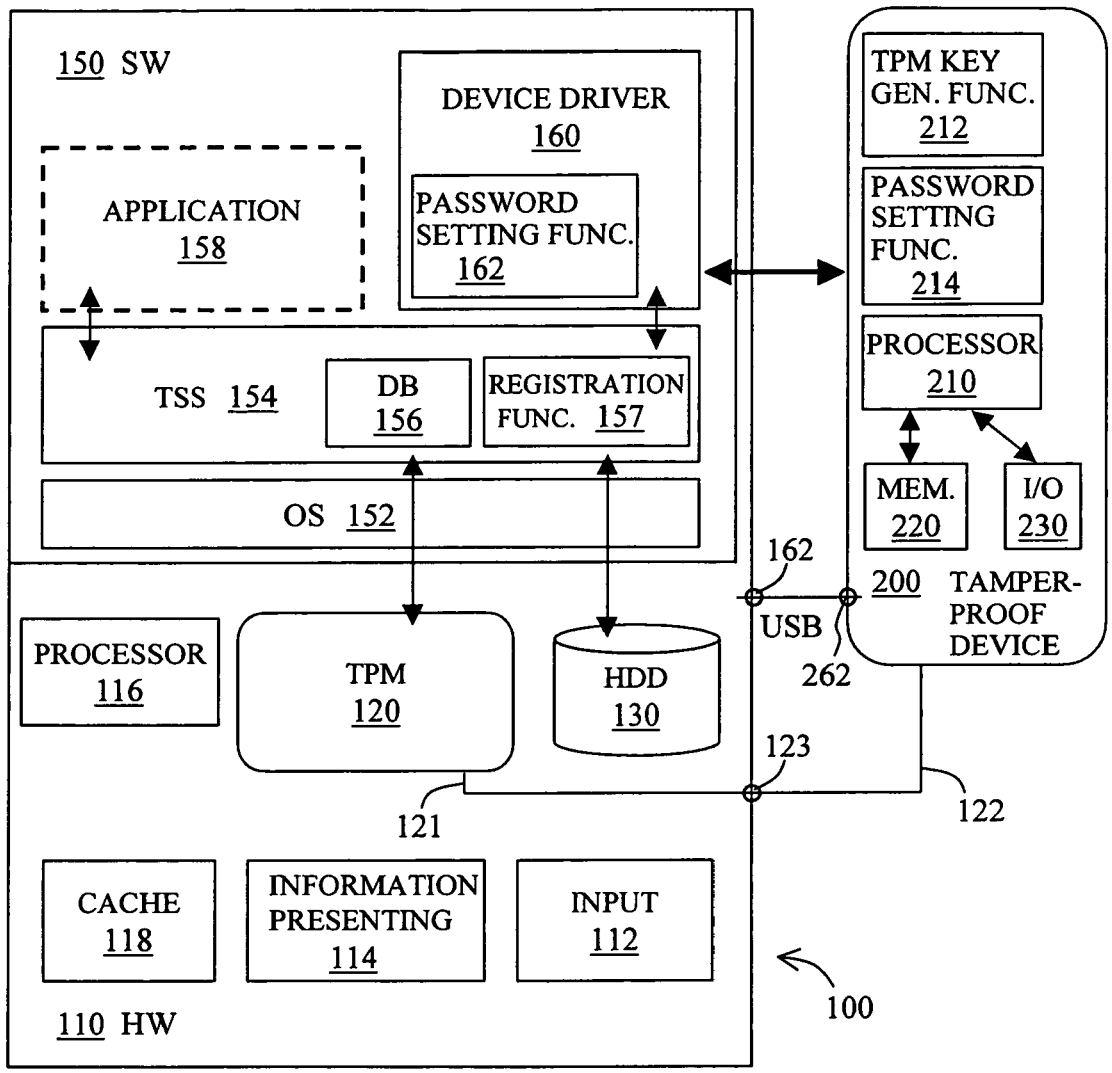
FIG. 1 shows schematic structures of an information processing apparatus and a tamper-proof device for authentication, in accordance with an embodiment of the present invention.

FIG. 1 shows schematic structures of an information processing apparatus 100 and a tamper-proof device for authentication 200, in accordance with an embodiment of the present invention. The information processing apparatus 100 may be a personal computer, a mobile telephone or an information processing terminal unit for example. The tamper-proof device 200 may be, for example, an IC card, a smart card or a USB token, which is protected against an attack using an analytic technique of decryption. The information processing apparatus 100 includes, as hardware (HW) 110, an input device 112 including a keyboard and a mouse, an information presenting section 114 including a display and a speaker, a processor 116, a TPM (Trusted Platform Module) 120 called a security chip, a cache memory 118 which temporarily stores a TPM key in compliance with the TCG standard and is an encryption and decryption key for the TPM, and a hard disk 130. The information processing apparatus 100 includes, as software (SW) 150, an OS (operating system) 152, a TSS (TCG Software Stack) 154 including a database (DB) 156 for TPM keys, i.e. a TCG software stack, an application 158 for generating, editing and presenting a file, and a device driver 160 for the tamper-proof device 200. The tamper-proof device 200 includes a processor or CPU 210, a memory 220 and an I/O 230. The processor 210 executes various functions in the form of the software and/or the hardware. The TPM 120 includes an SM bus 121 which extends to outside the TPM 120. The device driver 160 includes a password setting function 162. The tamper-proof device 200 includes a TPM key generating function 212 which generates a TPM key, and may further include a password setting function 214.

In FIG. 1, a user couples the tamper-proof device 200 via a USB connector or wire terminal 262 thereof to the information processing apparatus 100 via a USB connector or wire terminal 162 thereof, so that the information processing apparatus 100 receives authentication information and a TPM key from the tamper-proof device 200. Further, the tamper-proof device 200 may be coupled to the information processing apparatus 100 via a dedicated communication cable 122 which is coupled to the SM bus 121 via a connector or terminal 123.

Figure 2:
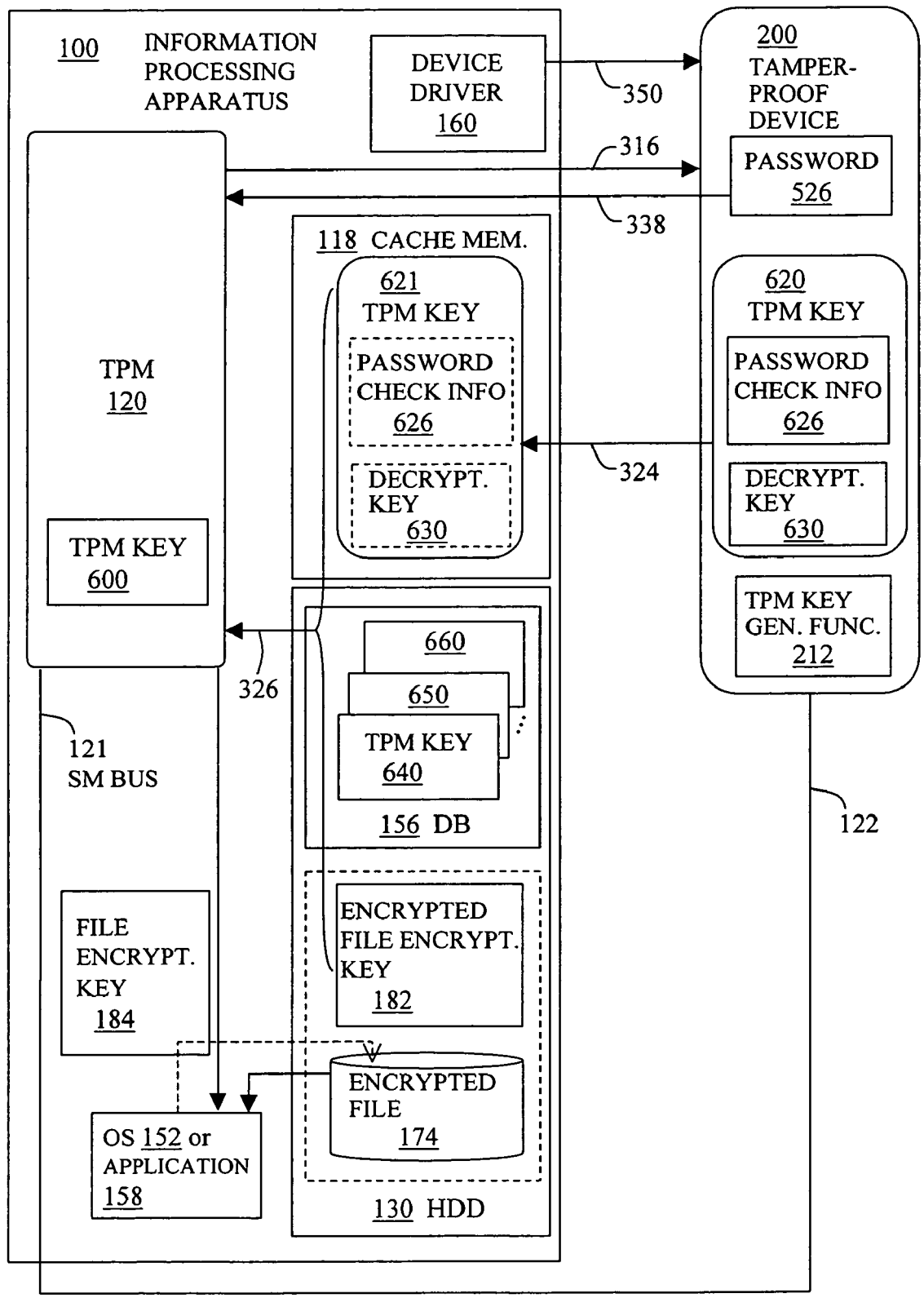
FIG. 2 shows transfer of a TPM key and a password for authentication from the tamper-proof device to the information processing apparatus, and shows authentication using the TPM key and the password, and decryption of an encrypted, file encryption/decryption key in the information processing apparatus, in accordance with the embodiment of the invention.

FIG. 2 shows transfer of a TPM key 620 and a password 526 for authentication from the tamper-proof device 200 to the information processing apparatus 100, and authentication using the TPM key 620 and the password 526, and shows decryption of an encrypted, file encryption/decryption key in the information processing apparatus 100, in accordance with the embodiment of the invention. The TPM 120 may sends and receives authentication information such as a parameter and a password, to and from the tamper-proof device 200 via the SM bus 121 and the communication cable 122, in addition to the USB connectors 162 and 262.

Figure 3:
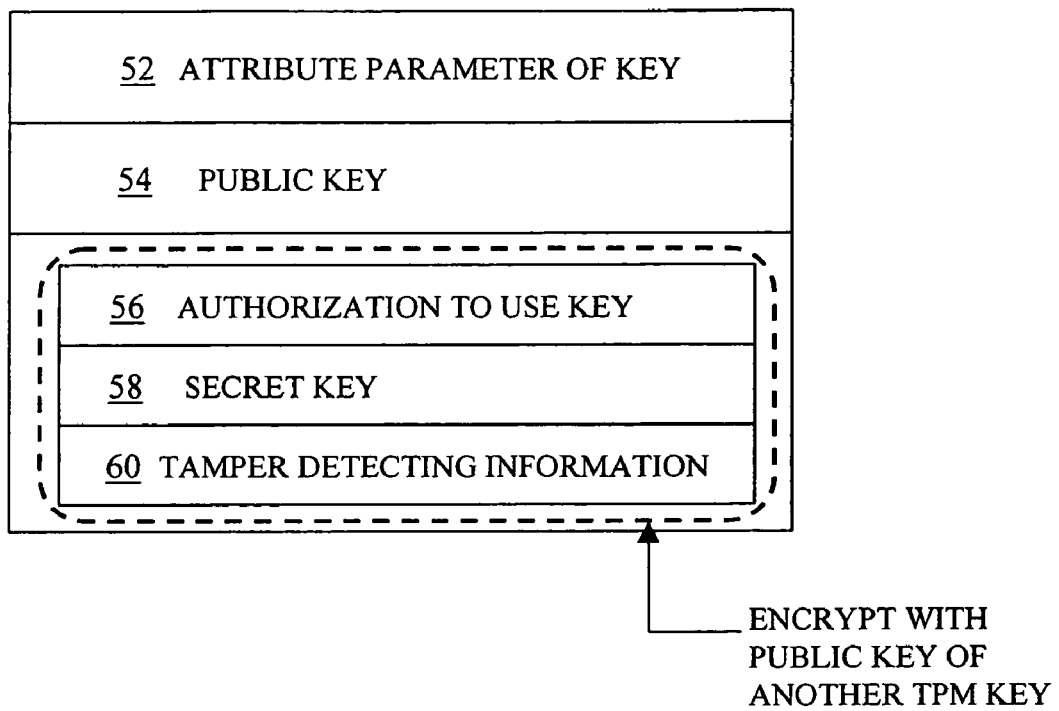
FIG. 3 shows the structure of each one of TPM keys in FIG. 2.

FIG. 3 shows the structure of each one of TPM keys 600, 620, 640, 650 and 660 in FIG. 2. The TPM key includes an attribute parameter of the key 52, a public key 54, information of authorization to use the key 56, a secret or private key 58, and tamper detecting information 60, in a known form. The public key 54 and the secret key 58 are in compliance with the public key cryptosystem. The public key 54 is used as an encryption key, and the secret key 58 is used as a decryption key. The authorization information 56, the secret key 58 and the tamper detecting information 60 of each one of the TPM keys 600, 620, 640, 650 and 660 are encrypted using a public key of another TPM key, and decrypted using a secret key, which is paired with this public key and which is included in the other TPM key.

Figure 4:
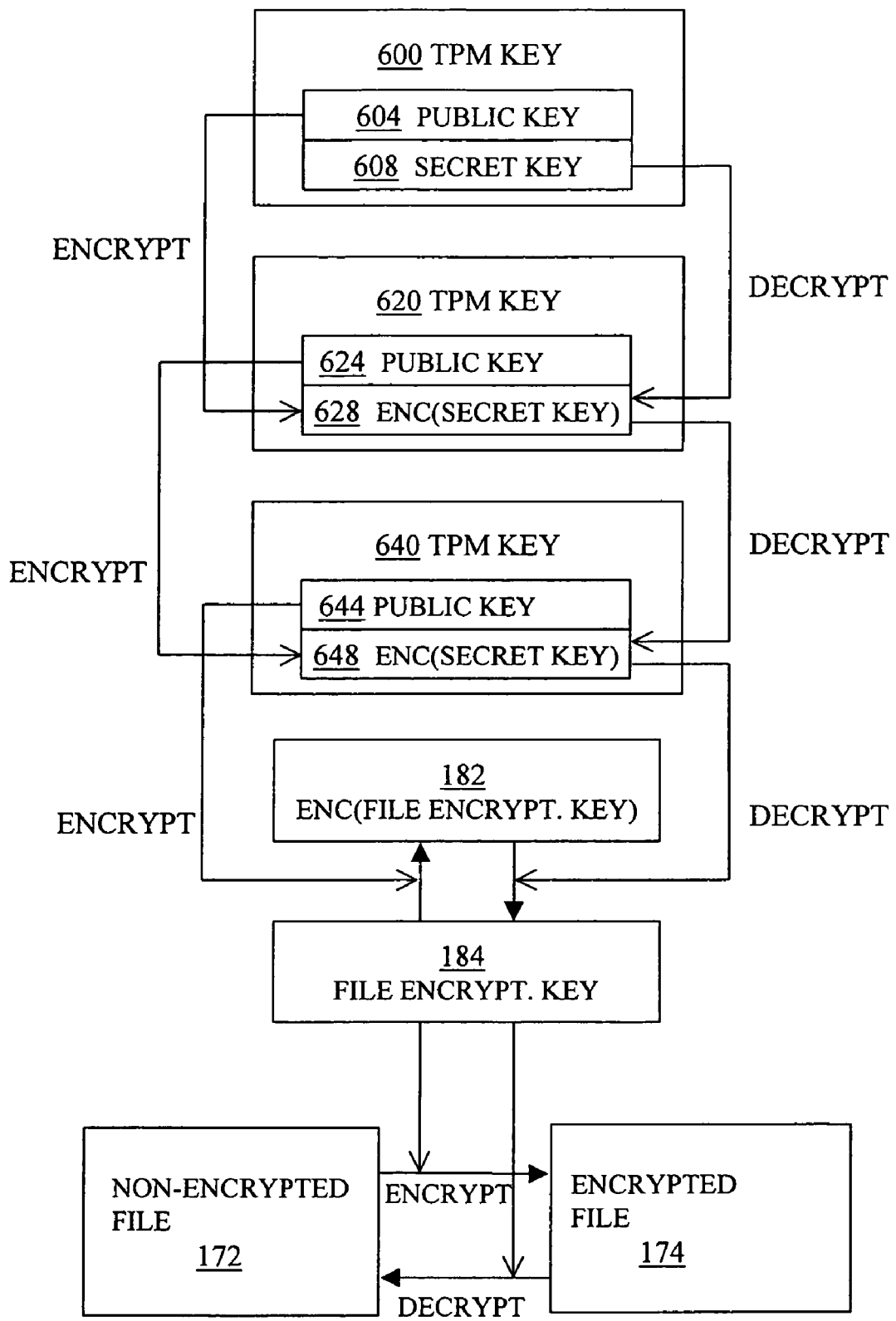
FIG. 4 is useful for explaining a process of encrypting a file encryption key using the TPM keys to be encrypted hierarchically.

FIG. 4 is useful for explaining a process of encrypting a file encryption key 184 using the TPM keys 600, 620 and 640 to be encrypted hierarchically. In the figure, the symbol "ENC ( )" denotes that a key in the parentheses is encrypted.

For preparation of the tamper-proof device 200, a user couples the tamper-proof device 200 to the information processing apparatus 100 via the USB connectors 162 and 262, and activates the TSS 154. First, the TPM 120 generates the non-encrypted TPM keys 600 and 640. The tamper-proof device 200 has a pair of a public key and a secret key for the TPM key 620.

The TSS 154 then receives a public key 604 of the TPM key 600 from the TPM 120 and provides the public key 604 to the tamper-proof device 200. The TPM key generating function 212 of the tamper-proof device 200 encrypts a secret key 628 of the TPM key 620 using the public key 604 of the TPM key 600, i.e., encrypts the TPM key 620 with the TPM key 600, and stores the encrypted secret key 628 as a decryption key 630 in the memory 220. Alternatively, the TPM 120 may receive the secret key 628 of the TPM key 620 from the tamper-proof device 200 via the TSS 154, encrypt the secret key 628 of the TPM key 620 using the public key 604 of the TPM key 600, and provides the encrypted secret key 628 via the TSS 154 to the tamper-proof device 200. In this case, the encrypted secret key 628 is deleted from the TPM 120 and the TSS 154. The TSS 154 receives a public key 624 of the TPM key 620 from the tamper-proof device 200 to save it in the database 156, and then provides it to the TPM 120. The TPM 120 encrypts a secret key 648 of the TPM key 640 using the public key 624, i.e., encrypts the TPM key 640 with the TPM key 620, and then provides the encrypted TPM key 640 to the TSS 154.

The non-encrypted TPM key 600 is held within the TPM 120 in a manner that it cannot be retrieved to or accessed from outside. Upon receiving a request by the TSS 154, the TPM 120 transfers, to the TSS 154, the other TPM keys 640, 650, ... 660 which have been encrypted hierarchically using the TPM key 600, and deletes the transferred TPM keys in the TPM 120. The TSS 154 manages, in the database 156, the location of the TPM key 620, i.e. information indicating that the TPM key 620 is located in the tamper-proof device 200, together with the public key 624 of the TPM key 620. The TSS 154 stores and manages the TPM keys 640, 650, ... 660 associated with each other and received from the TPM 120, in the database 156.

The application 158 generates the file encryption key 184, encrypts a non-encrypted file 172 using the file encryption key 184 to generate an encrypted file 174. The TPM 120 encrypts the file encryption key 184 using a public key 644 of the TPM key 640, to thereby generate an encrypted, file encryption key 182.

Thus, the encrypted secret key 628 of the TPM key 620 is decrypted using a secret key 608 of the TPM key 600, i.e., the encrypted TPM key 620 is decrypted with the TPM key 600. Similarly, the encrypted secret key 648 of the TPM key 640 is decrypted using the decrypted secret key 628 of the TPM key 620. The file encryption key 182 is decrypted using the decrypted secret key 648 of the TPM key 640, to thereby recover or reproduce the file encryption key 184. The encrypted file 174 is decrypted using the recovered file encryption key 184, to thereby recover the non-encrypted file 172.

Figure 5:
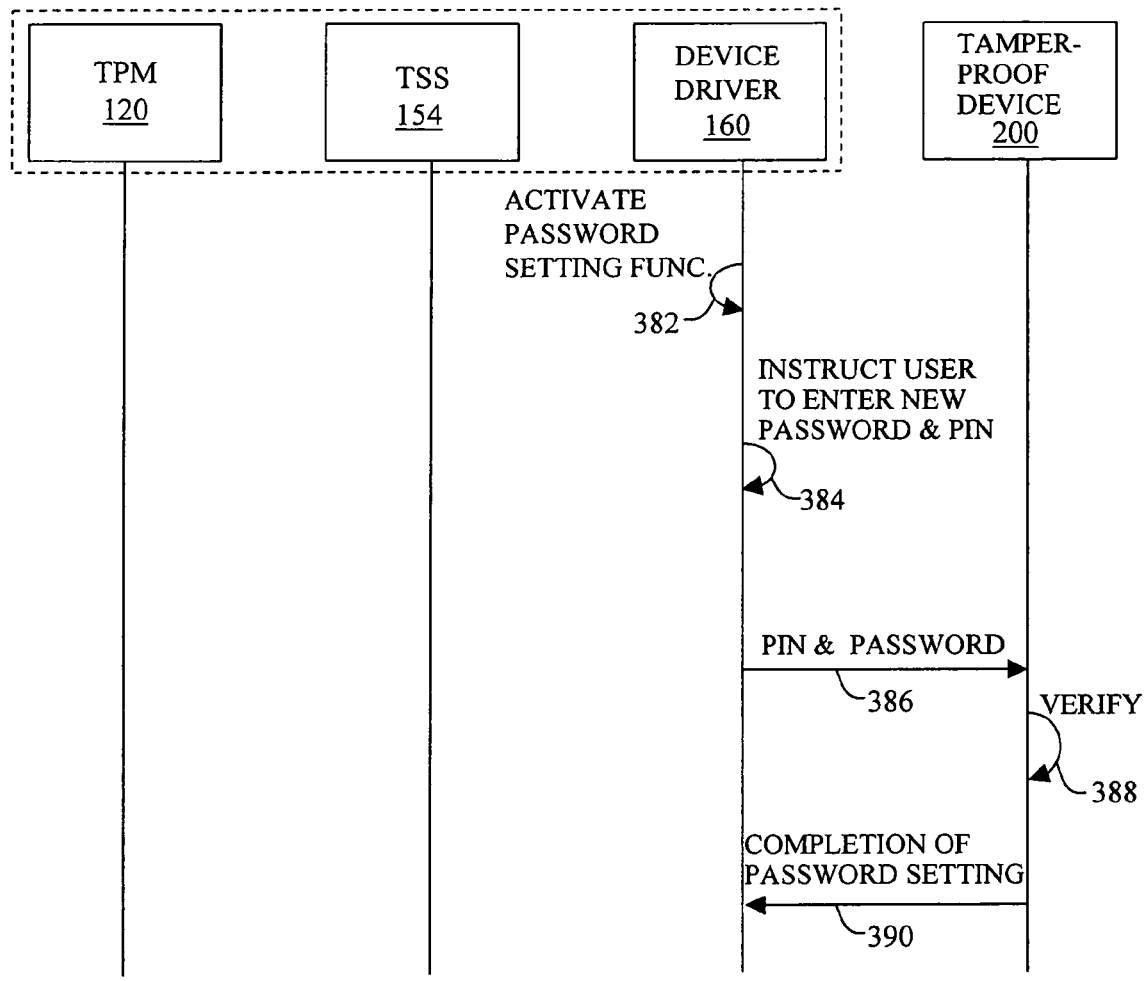
FIG. 5 shows the procedure of setting a new password in the tamper-proof device.

FIG. 5 shows the procedure of setting a new password in the tamper-proof device 200. This procedure is also followed when the tamper-proof device 200 is used for the first time. A PIN (Personal Identity Number) for the tamper-proof device 200 is pre-stored in the memory 220 of the tamper-proof device 200. At Step 382, a user activates the function 162 of setting a password for the device driver 160. At Step 384, the device driver 160 (password setting function 162) instructs the user to enter a new password and the PIN. At Step 386, the device driver 160 provides a new password 526 and the PIN entered by the user to the tamper-proof device 200. At Step 388, the tamper-proof device 200 verifies the PIN, stores the new password 526 in the memory 220 if the PIN is verified to be correct, generates password check information 626 in accordance with the new password 526, and stores the password check information 626 in the memory 220. The previous password and the previous password check information may be overwritten. At Step 390, the tamper-proof device 200 sends the device driver 160 a response which indicates that the new password has been set.

Referring to FIG. 2, a schematic procedure for encrypting in the information processing apparatus 100 a file generated by the application 158 will now be described.

The tamper-proof device 200 is not involved in encryption of a file. When a user prepares a non-encrypted file, i.e. a plaintext file, using the application 158, and then operates the application 158 so as to encrypt the file, the application 158 generates the non-encrypted, file encryption/decryption key 184 (hereinafter referred to as a "file encryption key") for this file, and encrypts this file using the file encryption key 184 to generate the encrypted or ciphertext file 174. The file encryption key 184 complies with the common key cryptosystem standard, such as 3DES and AES for example.

The TPM 120 encrypts the file encryption key 184 using the public key 644 of the TPM key 640 which is one of the TPM keys 640 to 660 managed by the TSS 154, to generate the encrypted file encryption key 182. The encrypted file encryption key 182 is stored together with the encrypted file 174 in a storage area of a hard disk 140 selected by the user. The secret key 648 within the TPM key 640 has been encrypted beforehand using the public key 624 of the TPM key 620 stored in the tamper-proof device 200 as described above. The secret key 628 of the TPM key 620 has been encrypted using the public key 604 of the TPM key 600 in the TPM 120. The TPM key 620 within the tamper-proof device 200 is not used to encrypt the file encryption key 184.

When a user couples the tamper-proof device 200 to the information processing apparatus 100 and operates the information processing apparatus 100 so as to open the encrypted file 174 which requires the TPM key 620 on the application 158, a predetermined parameter is transferred from the TPM 120 to the tamper-proof device 200 via the device driver 160 (at Step 316). Upon receiving the encrypted TPM key 620 from the tamper-proof device 200 via the device driver 160 (at Step 324), the information processing apparatus 100 temporarily stores the encrypted TPM key 620 as the TPM key 621 in the cache memory 118. The TPM 120 takes in the TPM key 621 (at Step 326). Next, the TPM 120 captures the password 526 from the tamper-proof device 200 in a conventional manner (at Step 338), and checks if the captured password 526 is correct based on the password check information 626 contained in the TPM key 621. The password check information 626 may be the same information as the password 526. In this case, the password 526 is compared with the password check information 626 to check whether the one match with the other. When the password 526 is correct, the TPM 120 decrypts the TPM key 621 using the TPM key 600, decrypts the encrypted file encryption key 182 for decryption of the encrypted file 174, using the decryption key 630 of the decrypted TPM key 621, i.e. the decrypted secret key 628, to thereby generate the non-encrypted file encryption key 184, and provides the file encryption key 184 to an application 158. The application 158 decrypts the encrypted file 174 using the decrypted file encryption key 184, to thereby generate the non-encrypted file 172.

Figure 6:
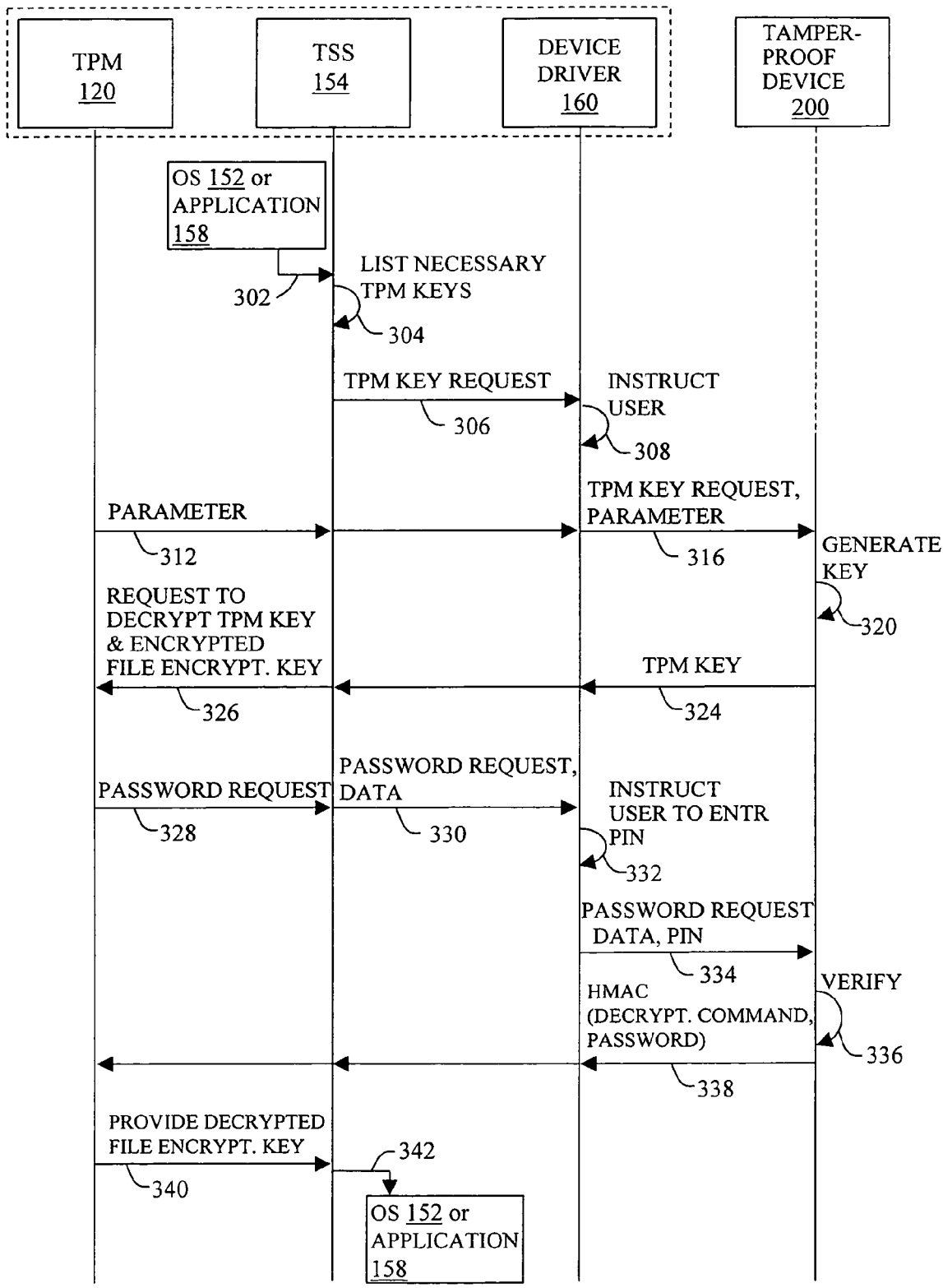
FIG. 6 shows communication among the TPM, the TSS (TCG Software Stack) and the device driver of the information processing apparatus, and the tamper-proof device, for decrypting the file encryption key, in accordance with the embodiment of the invention.

FIG. 6 shows communication among the TPM 120, the TSS 154 and the device driver 160 of the information processing apparatus 100, and the tamper-proof device 200, for decrypting the file encryption key 182, in accordance with the embodiment of the invention.

Referring to FIGS. 2 and 6, when a user operates the encrypted file 174 to open, the OS 152 or the application 158 at Step 302 requests the TSS 154 to decrypt the encrypted, file encryption key 182 to be used for decrypting the encrypted file 174. In response to the request, at Step 304, the TSS 154 searches the database 156 and generates a list of the TPM key 640 and the like which are relevant to the encrypted file encryption key 182. When the list includes identification information indicative of the location of the TPM key 620 and its public key which keys are managed by the tamper-proof device, the TSS 154 at Step 306 requests the TPM key 620 from the device driver 160. At Step 308, the device driver 160 instructs, on a display of the information presenting section 114 of the information processing apparatus 100, the user to couple the tamper-proof device 200 to the information processing apparatus 100 via the USB connectors 162 and 262. Alternatively, the tamper-proof device 200 may be coupled to the information processing apparatus 100 via the communication cable 122. Further alternatively, the tamper-proof device 200 may be coupled to the information processing apparatus 100 via the USB connectors 162 and 262 and the communication cable 122.

After the tamper-proof device 200 is coupled to the information processing apparatus 100 via the USB connectors 162 and 262 and/or the communication cable 122, the TPM 120 at Step 312 provides a parameter for generating the TPM key 620 to the device driver 160 via the TSS 154. At Step 316, the device driver 160 provides the tamper-proof device 200 with the request for the TPM key 620 and the parameter. The TPM key generating function 212 of the tamper-proof device 200 at Step 320 generates the TPM key 620 shown in FIG. 2 in accordance with the parameter.

At Step 324, the tamper-proof device 200 provides the generated TPM key 620 to the TSS 154 via the device driver 160. The TSS 154 temporarily stores the received TPM key 620 as the TPM key 621 in the cache memory 118, and at Step 326 provides the TPM 120 with the TPM key 621, another TPM key 640 associated with the file encryption key 182, and the encrypted file encryption key 182, and requests the TPM 120 to decrypt the TPM key 621 and its associated keys, i.e., the encrypted file encryption key 182 and the TPM key 640.

When the received TPM key 621 contains the password check information 626, the TPM 120 at Step 328 requests, from TSS 154, the password required for using the TPM key 621. At Step 330, the TSS 154 provides the device driver 160 with this password request and description data to be transferred back to the TPM 120 which is in this case data indicative of the request for decryption of the file encryption key 182. At Step 332, the device driver 160 instructs, on the display of the information processing apparatus 100, the user to enter the PIN for the tamper-proof device through the keyboard. At Step 334, the device driver 160 provides the tamper-proof device 200 with the password request, the data, and the entered PIN.

The tamper-proof device 200 at Step 336 verifies the received PIN. At Step 338, the tamper-proof device 200 supplies, via the device driver 160 and the TSS 154 to the security chip 120, the password 526 and a command to decrypt the encrypted file encryption key 182 which represents permission to use the TPM key 620, i.e. 621, in a form of the HMAC (Keyed Hashing for Message Authentication Code) for security. In accordance with the password check information 626, the TPM 120 checks a password 526. When the password 526 is correct, the encrypted file encryption key 182 is decrypted by the TPM 120 using the TPM keys 600, 621 and 640, to generate the decrypted file encryption key 184. At Step 340, the TPM 120 provides the TSS 154 with the recovered non-encrypted file encryption key 184. At Step 342, the TSS 154 provides the file encryption key 184 to the OS 152 or the application 158. The OS 152 or the application 158 decrypts the encrypted file 174 using this file encryption key 184 to recover the plaintext file 172, and the application 158 opens and presents the recovered plaintext file 172 to the information presenting section 114.

Figure 7:
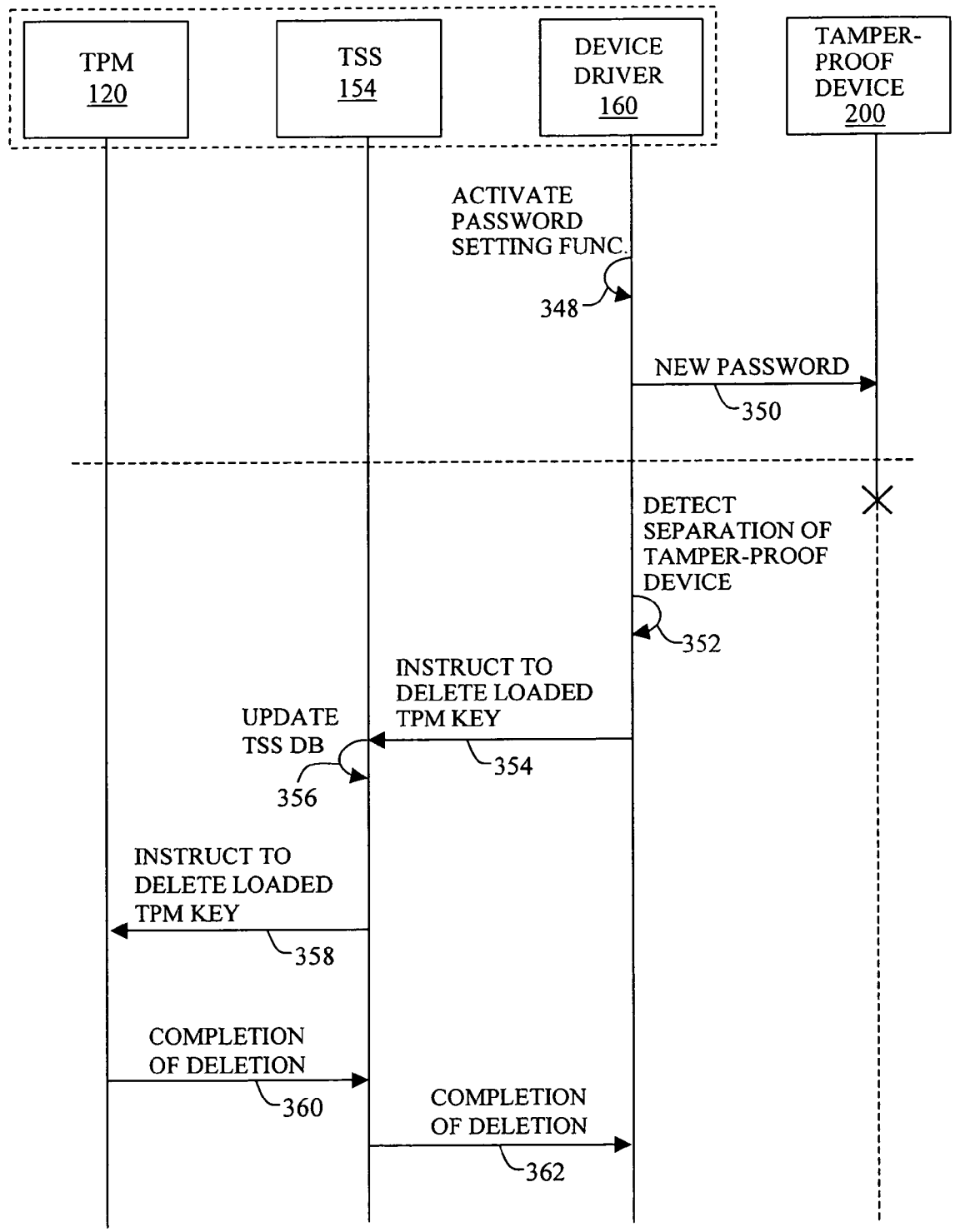
FIG. 7 shows the procedure between the TPM, the TSS and the device driver for changing a password and subsequent processing after separation of the tamper-proof device from the information processing apparatus, in accordance with the invention.

FIG. 7 shows the procedure between the TPM 120, the TSS 154 and the device driver 160 for changing a password and subsequent processing after separation of the tamper-proof device 200 from the information processing apparatus 100, in accordance with the invention.

The device driver 160 at Step 352 detects when the tamper-proof device 200 is separated from the information processing apparatus 100 at the USB connector 162. At Step 354, the device driver 160 instructs the TSS 154 to delete the loaded TPM key 621 in the cache memory 118. The TSS 154 at Step 356 updates the TSS database 156, and at Step 358 instructs the TPM 120 to delete the loaded TPM key 621 in the cache memory 118. The TPM 120 deletes the loaded TPM key 621 in the cache memory 118 to thereby update the database 156, and at Step 360 notifies the TSS 154 of completion of the deletion. At Step 362, the TSS 154 notifies the device driver 160 of the completion of the deletion.

After the PIN verification at Step 336 and the subsequent provision of the previous password at Step 338 in FIG. 6, the user activates the password setting function 162 of the device driver 160 of the information processing apparatus 100 at Step 348 shown in FIG. 7, in order to change the password 526 for the tamper-proof device 200 and the associated password check information 626. The device driver 160 then prompts the user to enter a new password through the keyboard of the input apparatus 112. At Step 350 in FIG. 7, the device driver 160 provides the new password to the tamper-proof device 200. The TPM key generating function 212 of the tamper-proof device 200 writes the new password over the previous password 526 stored in the memory 220, and accordingly changes the content of the password check information 626 within the TPM key 620 stored in the memory 220. In this case, no information related to the password is stored in the information processing apparatus 100, and hence it is not necessary to change the information stored in the information processing apparatus 100 in relation to the change of the password. The tamper-proof device 200 can be shared by a plurality of information processing apparatuses. Thus, even if the password for the tamper-proof device 200 is changed, it is not necessary to change information stored in the plurality of information processing apparatuses in relation to the change of the password.

Figure 8:
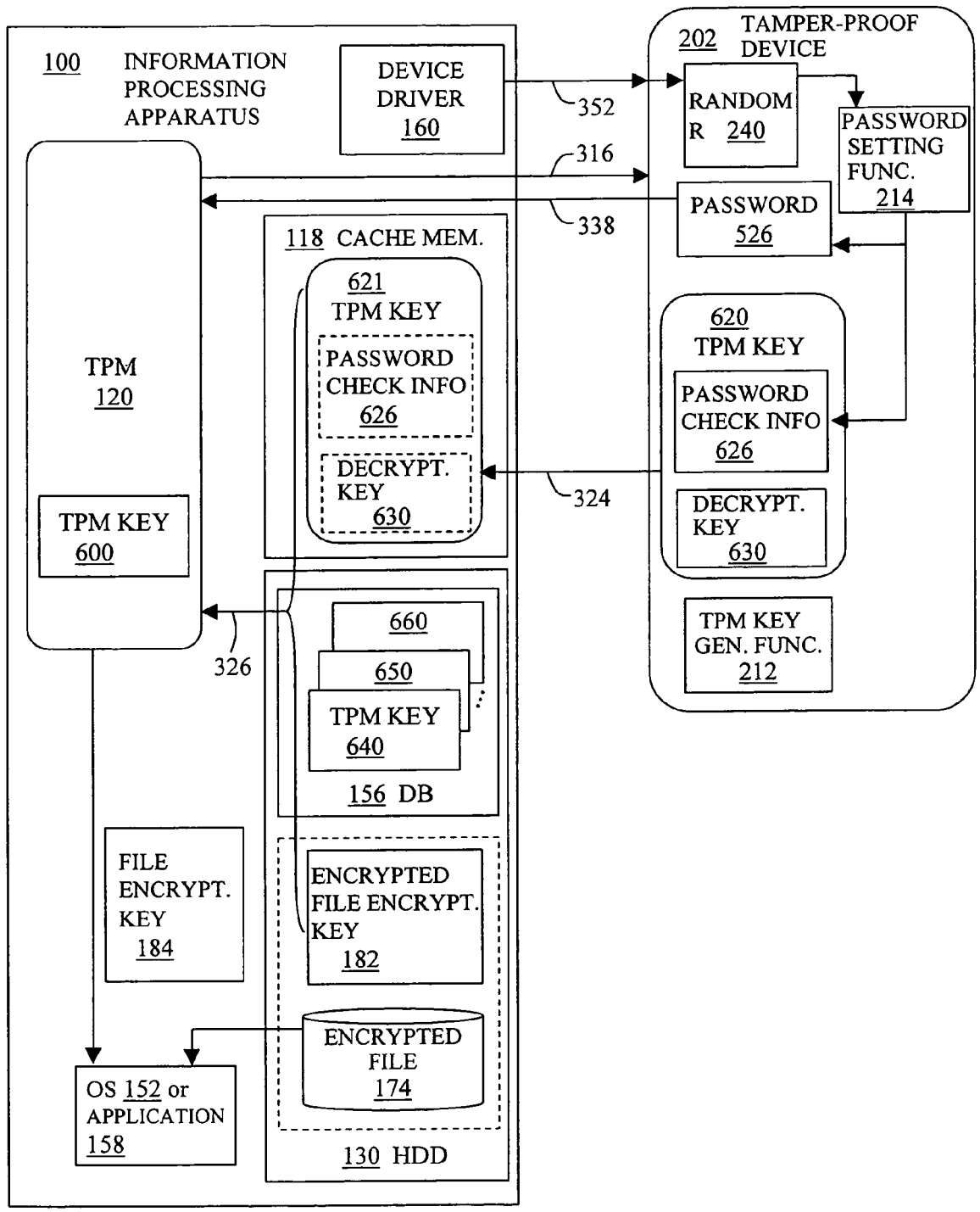
FIG. 8 shows another process of changing the password and the password check information within the TPM key, performed between the information processing apparatus and the tamper-proof device, in accordance with another embodiment of the invention.

FIG. 8 shows another process of changing the password 526 and the password check information 626 within the TPM key 620, performed between the information processing apparatus 100 and the tamper-proof device 200, in accordance with another embodiment of the invention.

As an alternative to allowing a user to manually change the password 526 as described above, every time when the tamper-proof device 200 is coupled to the USB connector 162 of the information processing apparatus 100, the password setting function 162 of the device driver 160 of the information processing apparatus 100 may send, right after Step 338, a request for setting a new password to a tamper-proof device 202, or generate a random number R to be used for generating a new password to supply it to the tamper-proof device 202. In accordance with this request, a random number supplying unit 240 generates or receives the random number R, and provides the random number R to the password setting function 214 implemented on the processor 210 of the tamper-proof device 202. The password setting function 214 generates a new password in accordance with the random number R, writes the new password over the previous password 526 stored in the memory 220, and accordingly changes the content of the password check information 626 within a TPM key 620 stored in the memory 220. The password may be changed prior to generation of the TPM key at Step 320 shown in FIG. 6. After that, in response to a request for the TPM key 620 by the information processing apparatus 100, the tamper-proof device 200, at Step 324 in FIG. 6, provides the information processing apparatus 100 with the TPM key 620 containing the changed password check information 626. In response to receipt of a request for the password 526 by the information processing apparatus 100, the tamper-proof device 202 at Step 336 provides the changed password 526 to the information processing apparatus 100.

As an alternative to deletion of the TPM key 621 within the cache memory 118 after separation of the tamper-proof device 200 from the information processing apparatus 100 in the embodiment above, the TPM key 621 may be left undeleted in the cache memory 118. In this case, even if a user have forgotten to bring the tamper-proof device 200, the user may enter the password 526 through the keyboard of the input device 112, to thereby decrypt the file encryption key 182 using the TPM key 621 in the cache memory 118. In this case, when the tamper-proof device 200 is coupled via the USB connector 162 to the information processing apparatus 100, the device driver 160 writes the updated TPM key 620 over the TPM key 621 in the cache memory 118 if it is determined that the password check information 626 of the TPM key 620 of the tamper-proof device 200 has been updated in comparison with the TPM key 621 in the cache memory 118.

Figure 9:
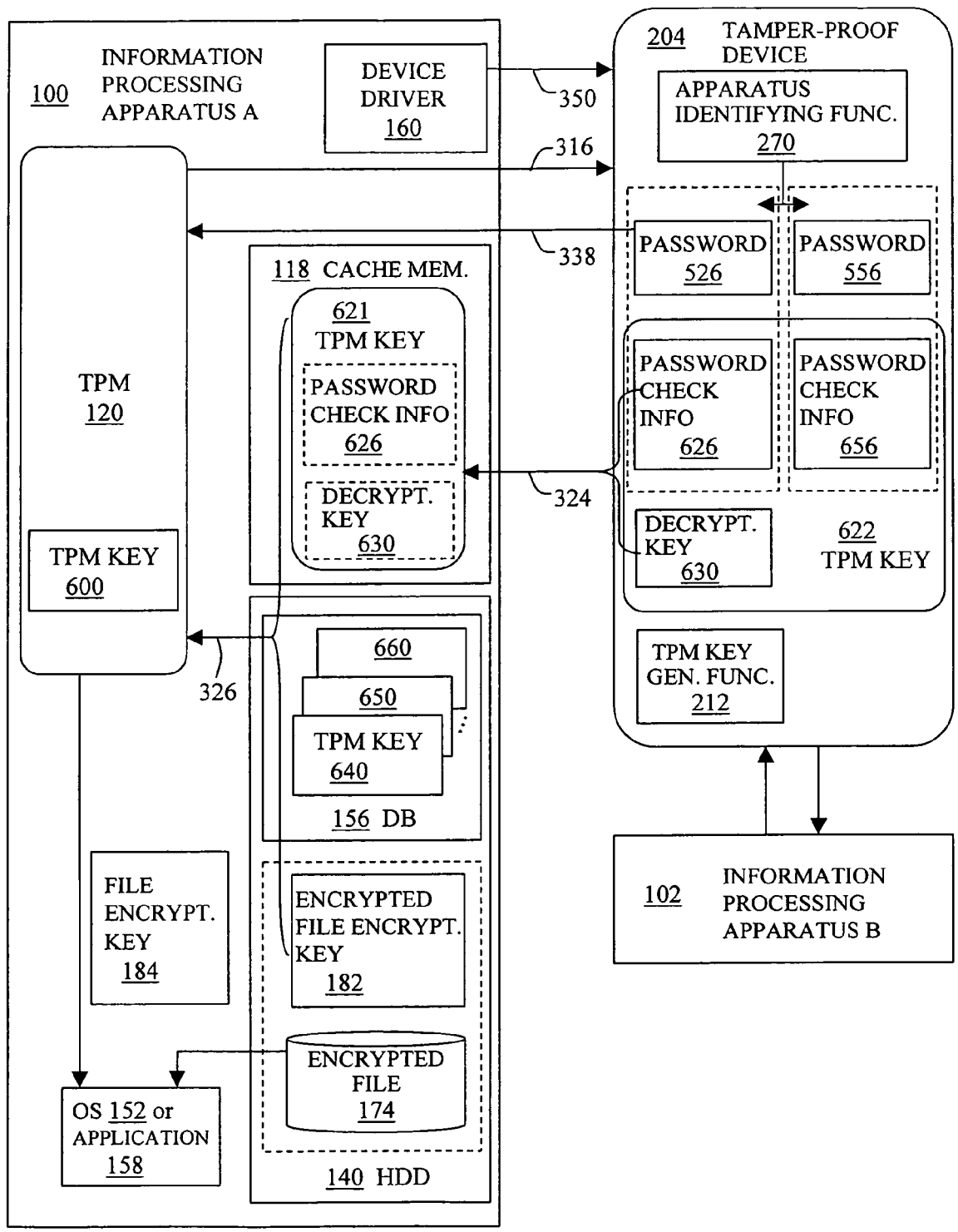
FIG. 9 shows a tamper-proof device which is used by a plurality of information processing apparatuses which use different passwords from each other, in accordance with a further embodiment of the invention.

FIG. 9 shows a tamper-proof device 204 which is used by a plurality of information processing apparatuses 100 and 102 which use different passwords from each other, in accordance with a further embodiment of the invention. The tamper-proof device 204 has an apparatus identifying function 270 executed by the processor 210, and stores, in the memory 220, different passwords 526 and 556, different password check information 626 and 656 which correspond to the respective passwords 526 and 556, and the decryption key 630.

Referring to FIGS. 6 and 9, the TPM 120 at Step 312 provides the TSS 154 with unique identification information of the information processing apparatus 100, for example a parameter containing a public key of the TPM key 600. At step 316, the TSS 154 provides the parameter containing the identification information to the tamper-proof device 204 via the device driver 160. At Step 320, in accordance with the identification information, the apparatus identifying function 270 of the tamper-proof device 204 selects the corresponding password 526 or 556 within a TPM key 622, and the corresponding password check information 626 or 656, for the information processing apparatus 100 or 102. The tamper-proof device 204 generates the TPM key 622 using the selected password 526 or 556 and the selected password check information 626 or 656. The tamper-proof device 204 at Step 324 provides the information processing apparatus 100 or 102 with the TPM key 620 containing the password check information 626 or 656 and the decryption key 630, and at Step 338 provides the information processing apparatus 100 or 102 with the corresponding password 526 or 656.

Figure 10:
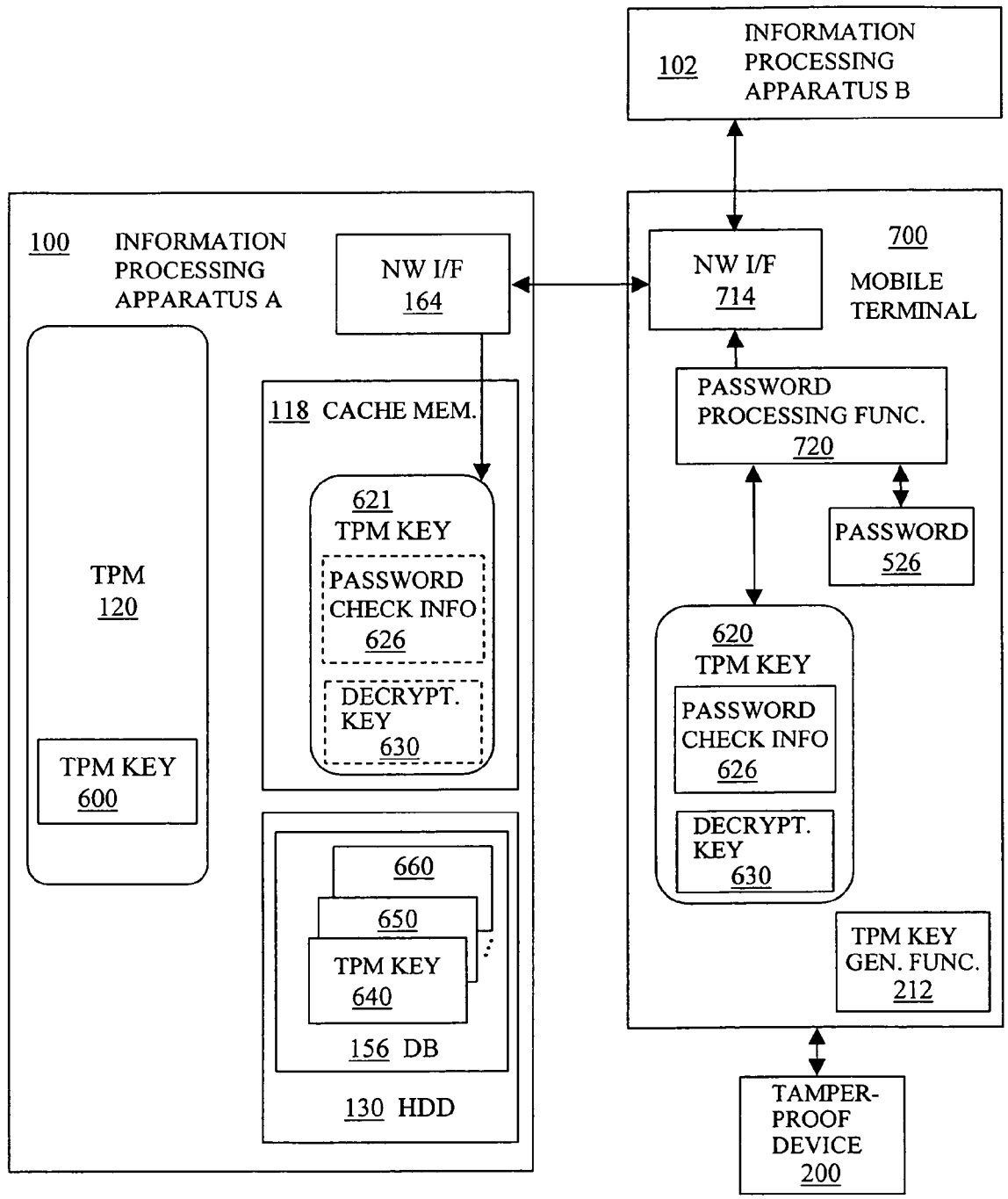
FIG. 10 shows communication for a mobile or portable terminal unit having a communication function for exampled, to change the TPM key to be used for the plurality of information processing apparatuses, in accordance with a still further embodiment of the invention.

FIG. 10 shows communication for a mobile or portable terminal unit 700 having a communication function, such as a PDA (Personal Digital Assistant) for example, to change the TPM key 621 to be used for the plurality of information processing apparatuses 100 and 102, in accordance with a still further embodiment of the invention. The information processing apparatus 100 includes a network interface (NW I/F), in addition to the elements shown in FIG. 1. The information processing apparatus 102 has a similar structure to that of the information processing apparatus 100. In this case, the TSS 154 does not delete the TPM key 621 in the cache memory 118. The mobile terminal unit 700 stores the TPM key 620 and the password 526 therein, and includes a password processing function 720 and a network interface (NW I/F) 714. The password processing function 720 of the mobile terminal unit 700 processes the password 526 which has been entered by a user to the mobile terminal unit 700. The information processing apparatuses 100 and 102 and the mobile terminal unit 700 can be connected with each other over a network, such as a short-range wireless network in compliance with the Bluetooth standard, a wireless LAN and a wired LAN, for example.

In FIG. 10, in order to change at once a common password for the information processing apparatuses 100 and 102 used by a user, the user sets a new password by operating keys on the mobile terminal unit 700, to thereby change the password 526 and the password check information 626 of the TPM key 620 which are stored in the mobile terminal unit 700. The new password may be set up by coupling, to the mobile terminal unit 700, an information storage device, such as a tamper-proof device (200) which stores the new password. The tamper-proof device, while storing the password 526, may not contain other information which is required to generate the TPM key 620. After the new password and the new password check information are stored in the mobile terminal unit 700, the mobile terminal unit 700, in response to the user's operation, communicates with the information processing apparatuses 100 and 102, and provides the TPM key 620 containing the changed password check information 626 to the information processing apparatuses 100 and 102. The information processing apparatus 100 updates the TPM key 621 stored in the cache memory 118 with the received TPM key 620. The information processing apparatus 102 operates similarly. Using the updated TPM key 621 in the cache memory 118, the TPM 120 verifies the password entered by the user or through the keys or information storage device, and provides the TPM key 621 stored in the cache memory 118 to the TPM 120 for decrypting the TPM key 640.

Figure 11:
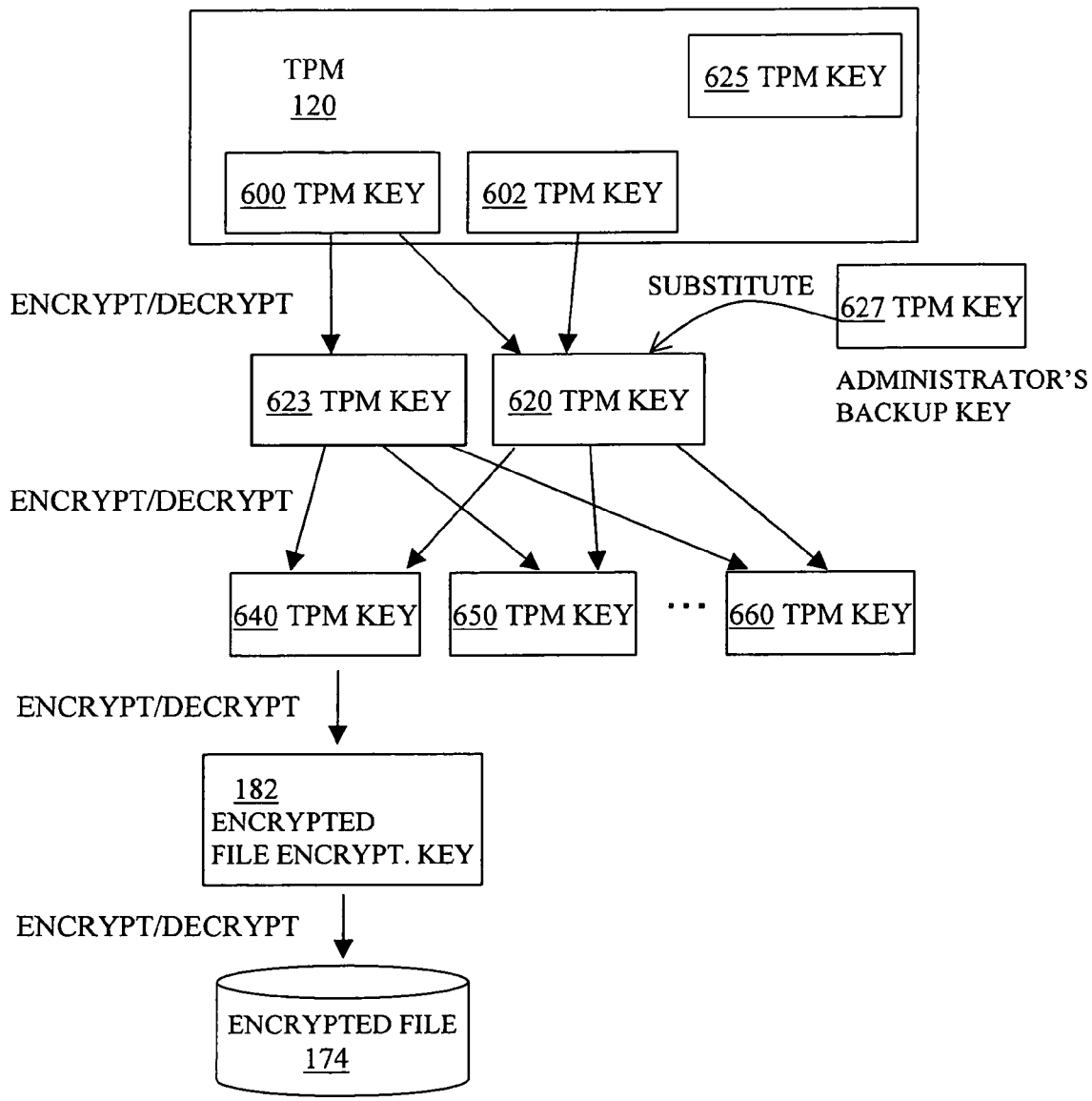
FIG. 11 is useful for explaining security measures in case a user has lost either one of the tamper-proof devices and the mobile terminal unit which are shown in FIGS. 1, 2, 8 and 9.

FIG. 11 is useful for explaining security measures in case a user has lost either one of the tamper-proof devices 200, 202 and 204 and the mobile terminal unit 700 which are shown in FIGS. 1, 2, 8 and 9. As described above, it is assumed that the TPM key 600 lies within the TPM 120, the TPM key 620 encrypted with the TPM key 600 lies within the tamper-proof device 200, 202 or 204 or the mobile terminal unit 700, and the TPM keys 640, 650, . . . 660 encrypted with the TPM key 620 are stored in the database (DB) 156 of the TSS 154.

When a user has lost the tamper-proof device 200, 202 or 204 or the mobile terminal unit 700, an administrator of the information processing apparatus 100 gives the TPM 120 a backup TPM key 627, which is a backup of the TPM key 620 and stored in another tamper-proof device or storage medium of the administrator, to thereby decrypt the TPM key 627 using the TPM key 600. The TPM 120 then generates a new TPM key 602 which is different from the TPM key 600. The other tamper-proof device encrypts a secret key of the TPM key 627 using a public key of the TPM key 602. The encrypted TPM key 627 is used as a substitute for the lost TPM key 620. The TPM key 600 is deleted. The other tamper-proof device generates the encrypted TPM key 627. This prevents an unauthorized party from conducting unauthorized loading of the TPM key 620 of the lost tamper-proof device 200 into the TPM 120.

Alternatively, when the user has lost the tamper-proof device 200, 202 or 204 or the mobile terminal unit 700, the administrator of the information processing apparatus 100 gives the TPM 120 the backup TPM key 627, which is a backup of the TPM key 620 and stored in another tamper-proof device or storage medium of the administrator, to thereby decrypt the TPM key 627 using the TPM key 600. Using the secret key of the decrypted TPM key 627, the TPM keys 640, 650 and 660 are decrypted. The administrator prepares a tamper-proof device having a public key and a secret key for a new TPM key 623 which are different from those of the TPM key 620. In this new tamper-proof device, the secret key of the TPM key 623 is encrypted using the public key of the TPM key 600. In the TPM 120, the secret keys of the TPM keys 640, 650 and 660 are re-encrypted using the public key of the TPM key 623. This prevents an unauthorized party from conducting unauthorized decryption of the TPM key 640 using the TPM key 620 of the lost tamper-proof device 200.

There is a risk that information within the tamper-proof device 200 may be leaked outside, if the tamper-proof device 200 is coupled to another information processing apparatus and the tamper-proof device 200 receives false information from this other information processing apparatus. In order to prevent such a risk, the information processing apparatus 100 and the tamper-proof device 200 may provide authentication to each other, in a manner as will be described below, for communication with each other.

Figure 12:
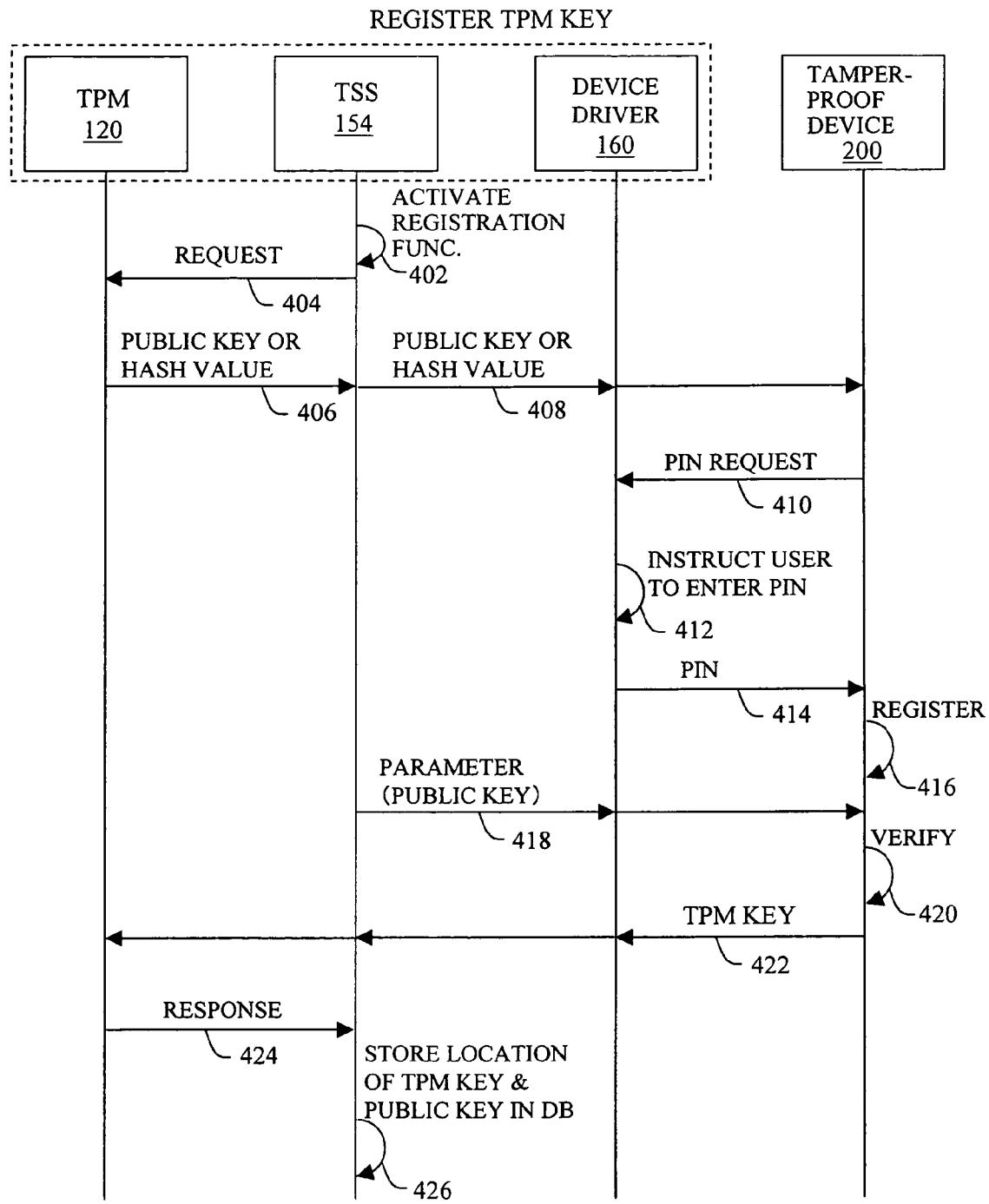
FIG. 12 shows the procedure of registering a TPM key with the TSS for mutual authentication between the information processing apparatus and the tamper-proof device, in accordance with an embodiment of the invention.

FIG. 12 shows the procedure of registering a TPM key with the TSS 154 for mutual authentication between the information processing apparatus 100 and the tamper-proof device 200, in accordance with an embodiment of the invention.

The TPM key 620 encrypted using the public key 604 of the TPM key 600 is pre-stored in the memory 220 of the tamper-proof device 200. At Step 402, a user activates a TPM key registration function of the TSS 154. At Step 404, the TSS 154 requests the TPM 120 for the public key 604 of the TPM key 600 or a hash value of the public key 604. At Step 406, the TPM 120 provides the TSS 154 with the public key 604 of the TPM key 600 of the tamper-proof device 200 or the hash value of the public key 604 shown in FIG. 11. At Step 408, the TSS 154 provides the public key 604 or the hash value to the tamper-proof device 200 via the device driver 160. At Step 410, the tamper-proof device 200 requests a PIN from the device driver 160. At Step 412, the device driver 160 instructs a user to enter the PIN. At Step 414, the device driver 160 provides the entered PIN to the tamper-proof device 200. At Step 416, the tamper-proof device 200 checks the PIN, and if the PIN is correct, stores the public key 604 or the hash value in the memory 220 and completes the registration.

At Step 418, the TSS 154 provides a parameter containing the public key 604 of the TPM key 600 to the tamper-proof device 200 via the device driver 160. The tamper-proof device 200 at Step 420 verifies the public key 604 contained in the received parameter using the already registered public key 604 or the hash value of the public key 604. If the received public key 604 is verified to be correct, the tamper-proof device 200 at Step 422 generates and provides the TPM key 620 to the TPM 120 via the device driver 160 and the TSS 154. The TPM 120 decrypts the TPM key 620 using the TPM key 600 and verifies the decrypted TPM key 620. When the TPM key 620 is verified to be correct. The TPM 120 at Step 424 returns a response to the TSS 154. At Step 426, the TSS 154 stores, in the database (DB) 156, the location of the TPM key 620, i.e. an indication that the TPM key 620 is stored in the tamper-proof device 200, and the public key 624 of the TPM key 620. This completes registration of the public key 624 of the TPM key 620.

Figure 13:
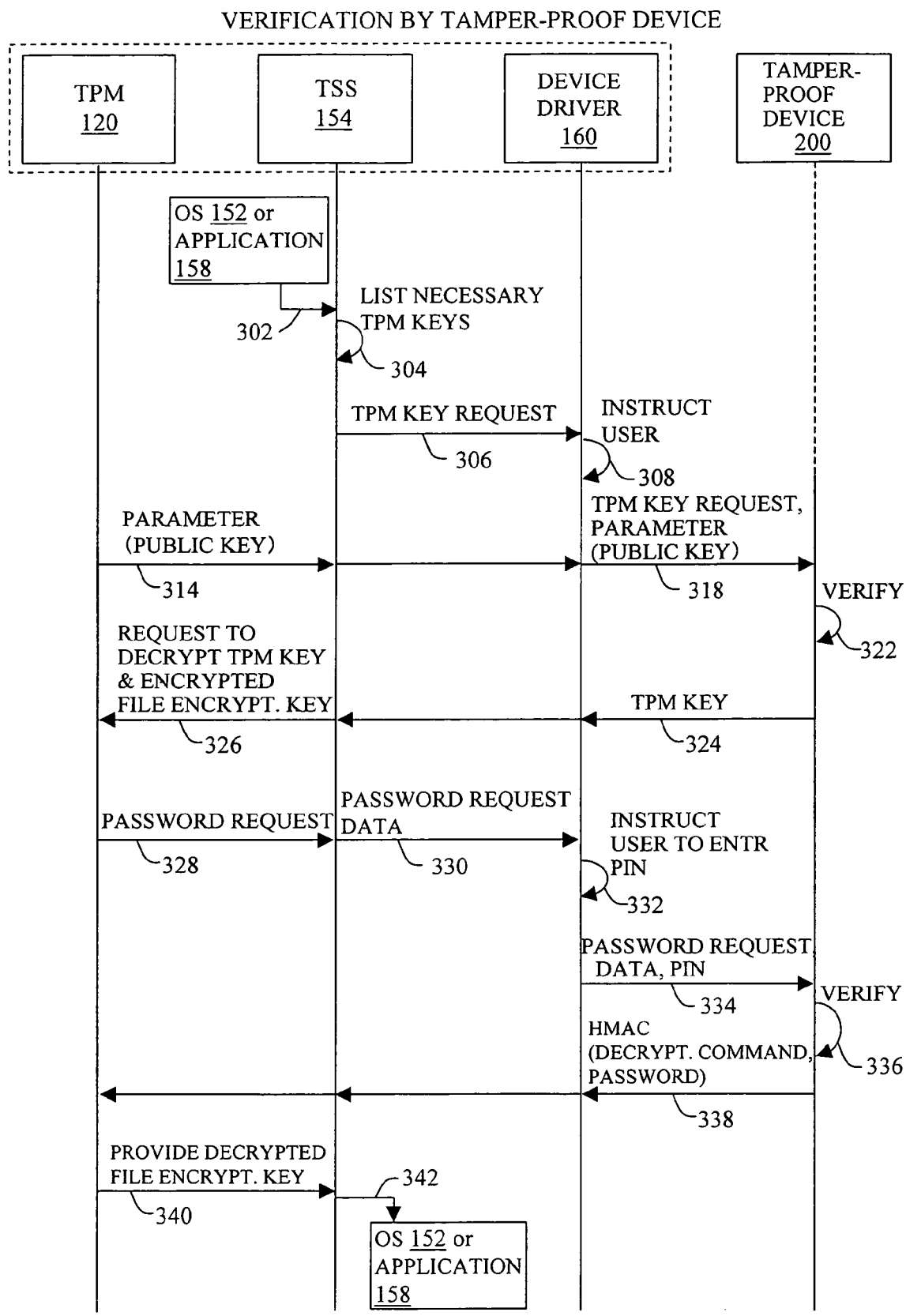
FIG. 13 shows the procedure of mutual authentication between the information processing apparatus and the tamper-proof device, using the public key registered with the tamper-proof device for generation of the TPM key by the tamper-proof device and using the public key registered with the TSS in FIG. 12.

FIG. 13 shows the procedure of mutual authentication between the information processing apparatus 100 and the tamper-proof device 200, using the public key 604 registered with the tamper-proof device 200 for generation of the TPM key 620 by the tamper-proof device 200 and using the public key 624 registered with the TSS 154 in FIG. 12. Steps 302 to 308 and Steps 324 to 340 are similar to those shown in FIG. 6, and hence are not described again.

At Step 314, the TPM 120 provides a parameter containing the public key 604 of the TPM key 600 via the TSS 154 to the device driver 160. At Step 318, the device driver 160 provides the tamper-proof device 200 with a request for the TPM key 620 and the parameter containing the public key 604. At Step 322, the tamper-proof device 200 verifies the public key 604 using the registered public key 604 or the hash value of the registered public key 604. If the public key 604 is verified to be correct, the tamper-proof device 200 generates the TPM key 620.

Figure 14A:
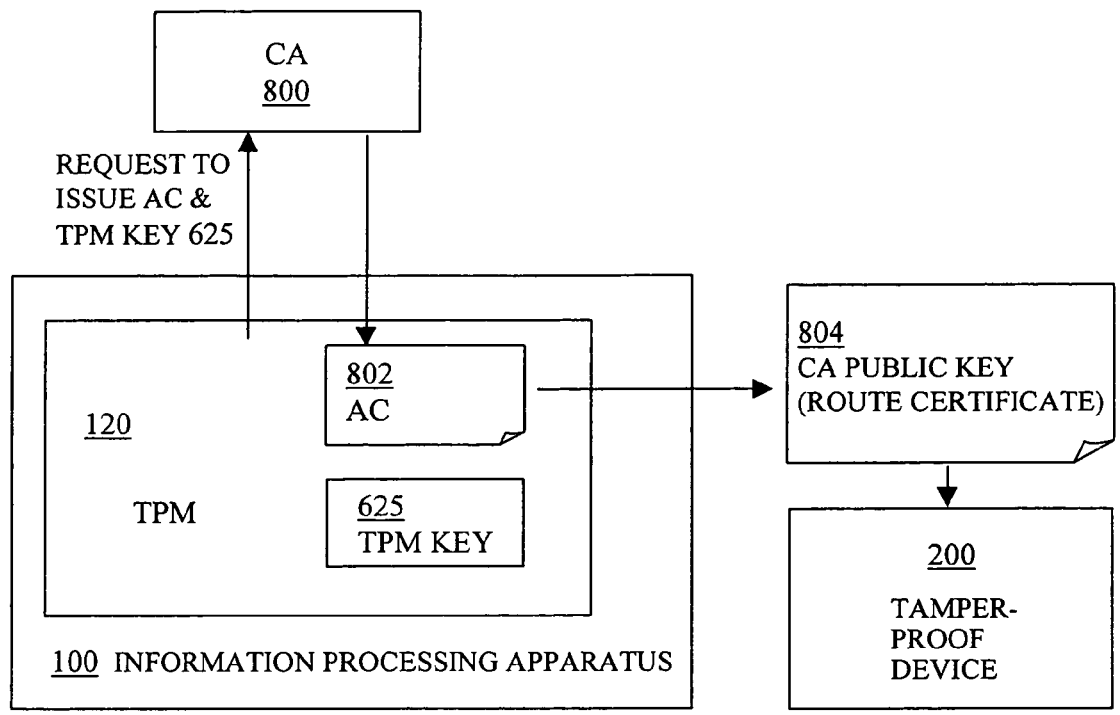
FIGS. 14A and 14B are useful for explaining mutual authentication between the information processing apparatus and the tamper-proof device using an attribute certificate of a TPM key which lies within the TPM.
Figure 14B:
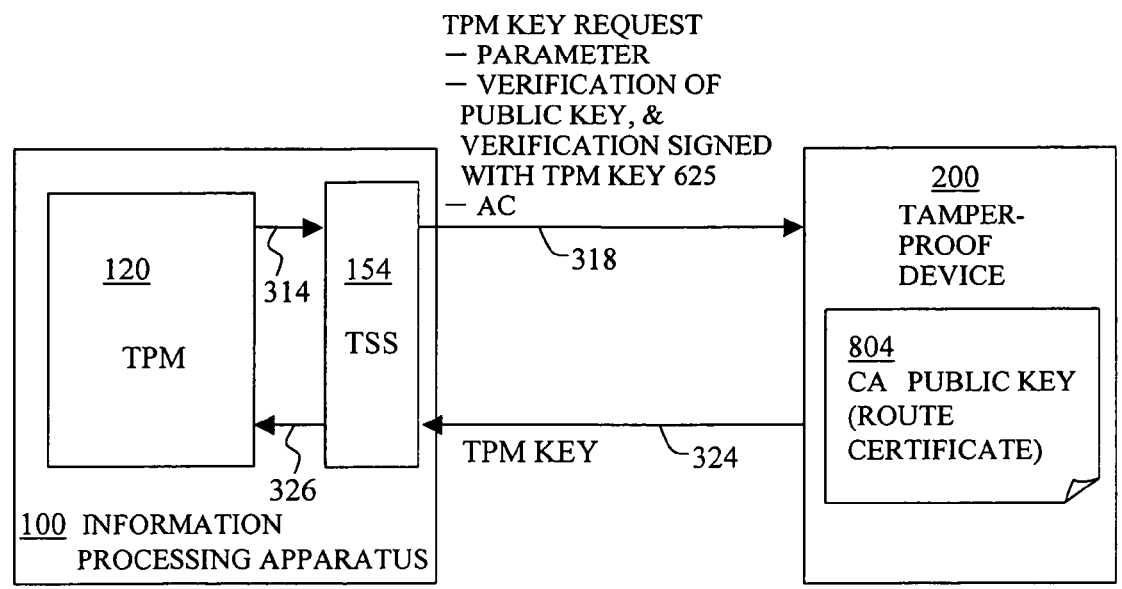

FIGS. 14A and 14B are useful for explaining mutual authentication between the information processing apparatus 100 and the tamper-proof device 200 using an attribute certificate of a TPM key 625 which lies within the TPM 120.

In FIG. 14A, for preparatory processing, the TPM 120 is caused to generate the TPM key 625 (see FIG. 11) and requests a certificate authority or CA 800 to issue an attribute certificate or AC 802 which certifies that the TPM key 625 can neither moved nor retrieved from the TPM 120. The attribute certificate 802 is stored in the TPM 120. The attribute certificate 802 contains an indication value which indicates that the TPM key 625 cannot be moved from the TPM 120, the value of a public key of the irremovable TPM key 625, and encrypted versions of hash values of the two, indication and key values which versions have been encrypted using a secret key of the CA 800. In addition, the TPM 120 pre-stores a public key 804 of the CA 800 as a route certificate for verification of the attribute certificate 802, into the memory 220 of the tamper-proof device 200 via the USB connector 162.

In FIG. 14B, the tamper-proof device 200 is coupled to the information processing apparatus 100 via the USB connector 162. When the TPM 120, at Step 314 in FIG. 13, provides the TSS 154 with the parameter (containing the public key 604) to be used for generating the TPM key 620, it provides the TSS 154 also with resultant verification of the public key 604 in the parameter which is a result of verification by the TPM 120, a signed version of the resultant verification which has been signed with the TPM key 625 (i.e., a secret key of the TPM key 625), and the attribute certificate (AC) 802. At Step 318, the TSS 154 provides the tamper-proof device 200 with the parameter, the resultant verification, the signed resultant verification, and the attribute certificate (AC) 802.

At Step 322, the tamper-proof device 200 verifies the attribute certificate 802 using the route certificate 804 which lies within the tamper-proof device 200, to check or verifies as to whether the attribute certificate 802 has been tampered. If it is verified that the attribute certificate 802 has not been tampered, the tamper-proof device 200 uses the public key of the TPM key 625 within the attribute certificate 802 to verify that the signature has not been tampered, to thereby verify whether the public key 604 in the parameter has not been tampered. In this manner, it is confirmed that the public key 604 in the parameter is managed in the TPM 120. If the public key 604 is not tampered, the tamper-proof device 200 at Step 324 generates and provides the TPM key 620 to the TSS 154.

The above-described embodiments are only typical examples, and their combination, modifications and variations are apparent to those skilled in the art. It should be noted that those skilled in the art can make various modifications to the above-described embodiments without departing from the principle of the invention and the accompanying claims.

What is claimed is:

1. An information processing apparatus being adapted to communicate with a tamper-proof device, and comprising:
   a TPM to store a first trusted platform module (TPM) key, the first TPM key having a first public key and a first private key associated with the first public key;
   a key management module
      to receive a parameter having the first public key from the TPM,
      to provide the received parameter to the tamper-proof device,
      to receive from the tamper-proof device a second TPM key, the second TPM key having a second private key which has been encrypted using the first public key included in the provided parameter, and having a second public key associated with the second private key, the second TPM key containing password check information generated by the tamper-proof device, and
      to provide the TPM with the second TPM key; and
   a file processing module receiving a file encryption key from the key management module, encrypting a file with the file encryption key, and decrypting the encrypted file with the file encryption key,
   the TPM
      to receive the second public key from the key management module,
      to generate a third TPM key, the third TPM key having a third private key which has been encrypted using the second public key, and a third public key associated with the third private key, and
      to encrypt the file encryption key with the third public key; wherein
   when the tamper-proof device is coupled to the information processing apparatus, the key management module receives the second TPM key from the tamper-proof device, stores the received second TPM key in a memory associated with the key management module, and provides the stored second TPM key to the TPM,
   when the TPM uses the second TPM key received from the key management module, the TPM requests the tamper-proof device to provide a password associated with the password check information contained in the second TPM key which is used by the TPM, receives the password from the tamper proof device, and verifies the received password using the password check information contained in the second TPM key which is used by the TPM;
   when it is verified that the password is correct, the TPM decrypts the second TPM key using the first private key, decrypts the third TPM key using the decrypted second private key, and decrypts, using the decrypted third private key, the encrypted file encryption key for decrypting the file; and
   the file processing module decrypts the file using the decrypted file encryption key.

2. The information processing apparatus according to claim 1, wherein, when the tamper-proof device is coupled to the information processing apparatus, the key management module temporarily stores the second TPM key in the memory; and
   when the tamper-proof device is separated from the information processing apparatus, the key management module deletes the second TPM key stored in the memory.

3. The information processing apparatus according to claim 1, wherein, when the tamper-proof device is coupled to the information processing apparatus, the key management module stores the second TPM key in the memory; and
   when the tamper-proof device is coupled again to the information processing apparatus after the separation from the information processing apparatus, the key management module updates the second TPM key stored in the memory with a new second TPM key received from the tamper-proof device.

4. The information processing apparatus according to claim 1, wherein the TPM is adapted to be coupled to the tamper-proof device via a dedicated line; and
   the TPM sends, via the dedicated line to the tamper-proof device, the parameter, and receives a password from the tamper-proof device via the dedicated line.

5. The information processing apparatus according to claim 1, wherein, when the tamper-proof device is coupled to the information processing apparatus, the TPM sends, via the key management module to the tamper-proof device, the parameter, a signature which has been generated using a fourth TPM key, and an attribute certificate of the fourth TPM key which has been certified by a certificate authority (CA).

6. In an information processing apparatus comprising a TPM, a processor and a memory and being adapted to communicate with a tamper-proof device, a method for password authentication and decrypting a trusted platform module (TPM) key, the method comprising:
   storing, in the TPM, a first TPM key having a first public key, and a first private key associated with the first public key;
   causing the TPM to generate a third TPM key, the third TPM key having a third private key which has been encrypted using a second public key of a second TPM key, and having a third public key associated with the third private key;
   receiving from the TPM a parameter having the first public key, providing the received parameter to the tamper-proof device, and receiving from the tamper-proof device the second TPM key, when the tamper-proof device is coupled to the information processing apparatus, the second TPM key having a second private key which has been encrypted using the first public key included in the provided parameter, and having the second public key associated with the second private key, the second TPM key containing password check information generated by the tamper-proof device;
   storing the received second TPM key in a memory;
   providing the TPM with the stored second TPM key and with the third TPM key;
   requesting the tamper-proof device to provide a password associated with the password check information contained in the second TPM key, when the stored second TPM key is used by the TPM;
   receiving the password from the tamper-proof device, and causing the TPM to verify the received password using the password check information contained in the second TPM key which is used by the TPM;
   causing, when it is verified that the password is correct, the TPM to decrypt the second TPM key using the first private key, decrypt the third TPM key using the decrypted second private key, and decrypt, using the decrypted third private key, an encrypted file encryption key for decrypting a file; and
   decrypting the file using the decrypted file encryption key.

* * * * *